United States Patent Office 2,793,962
Patented May 28, 1957

2,793,962

MANUFACTURE OF METALLIC SOAPS USEFUL AS DRIERS

Albert V. Collins, Lakewood, and Lorenz C. Leopold, Fairview Park, Ohio, assignors to The McGean Chemical Company, Cleveland, Ohio, a corporation of Ohio No Drawing. Application September 10, 1952,
Serial No. 308,941

9 Claims. (Cl. 106—310)

This invention relates to manufacture of metallic soaps useful as driers; and it relates more particularly to processes of producing improved soaps of alkaline earth and heavy metals which possess certain distinctive physical and chemical characteristics rendering them especially suitable for drier purposes, whether employed in solid or in liquid form. The process of the invention involves, essentially, providing a reaction mixture wherein are present a compound which includes the radical of an organic acid containing at least seven carbon atoms, an unsubstituted inorganic phosphate, and a compound of a drier metal, and causing these components to react with formation of a metal soap complex, wherein the association of the metal with the radicals of the organic acid and the unsubstituted phosphoric acid is intimate and of such nature that the thus phosphatized metal soap of the organic acid is in general more easily fusible than the corresponding straight or unphosphatized metal soap of the prior art, and dissolves in the usual drier solvents to form solutions possessing excellent stability and other desirable properties.

As is well known, metal soap driers serve in a wide variety of specific industrial uses to catalyze the transformation of drying oils into solid condition by promoting the mechanisms of oxidation, polymerization and association. Lead, cobalt, manganese and calcium soaps are among those commonly employed for this purpose. Soaps of copper and zinc are additionally useful as fungicidal agents, and aluminum soaps are effective thickening agents. Commercial driers are ordinarily dissolved in any of various solvents suitable for the purpose, most usually in petroleum distillates such as those commonly termed petroleum spirits, mineral spirits, etc., and marketed in the form of solutions containing a predetermined percentage of the drier metal.

According to known methods, metal soaps may be prepared either by precipitation from an aqueous reaction mixture, or by fusing together the materials to be reacted. In either type of process, the resulting product is a salt (called a soap) formed by replacement of the acid hydrogen of the relatively high-molecular and usually monobasic organic acid with a heavy metal. The precipitation method being the more common in actual practice, it will be more particularly referred to hereinafter, although it is to be understood that practice of the invention in a fusion process is not necessarily excluded.

In making a precipitated drier in accordance with known prior practice, the organic acid component is neutralized (saponified) with aqueous alkali, commonly sodium hydroxide, to form an alkali metal soap of said acid. From the resultant aqueous soapy mixture, the desired heavy metal soap is then precipitated by adding to said soapy mixture an aqueous solution of a salt of such heavy metal. After being washed free of water solubles, the wet precipitate of heavy metal soap is dried in some appropriate manner, usually by melting the precipitate, or attempting to do so, at a temperature above the boiling point of water. The dried metallic soap may then be dissolved in petroleum spirits or the like to produce a liquid drier.

Alternatively, preparation of the heavy metal soap has often been accomplished, in prior practice, by fusing a mixture of the organic acid with the oxide, hydroxide, carbonate or acetate of the metal in question, to bring about direct reaction between the components of the mixture. This method is not applicable to all metallic soaps because of the low reactivity of the salts or oxides of some metals with fatty acids. It is employed chiefly for the manufacture of lead and zinc soaps. The fused drier product may be dissolved in petroleum spirits or other suitable solvent to provide a solution of known drier metal content for use in the usual manner. The fusion method is much less suitable to use in practicing the present invention than is the precipitation method.

Due to certain inherent physical and chemical characteristics of metallic soaps as prepared by both types of methods heretofore known, the manufacture and employment of such metallic soaps, as well as solutions thereof, as driers has been attended in actual practice with certain serious objections and difficulties well known to those skilled in the art. Although these are of long standing, and although many attempts have been made over the years to overcome them, none of the solutions of the problem heretofore proposed has proved wholly satisfactory, either because only incompletely effective or because of economic considerations.

Referring to the precipitation type of method more especially, the aforesaid objections and difficulties long encountered in prior practice have included the following:

(a) Certain soaps, especially alkaline earth metal soaps, are relatively infusible. When it is attempted to melt such precipitated soaps for dehydration purposes, they solidify, partially decompose and char, and become largely insoluble in such solvents as petroleum spirits. The resultant products are consequently useless as either solid or liquid driers.

(b) Heavy metal soaps of linseed fatty acids and similar vegetable acids are fusible, but the high temperatures required to melt the linoleate, for example, are accompanied by oxidation which darkens the soap and reduces its solubility. Moreover, such soaps dehydrate very slowly.

(c) Heavy metal soaps of refined tall oil and crude naphthenic acids are soft, sticky solids which are extremely difficult to remove from commercial packages, particularly when only a portion of the contents is required for immediate use.

(d) Certain heavy metal soaps, notably the naphthenates of cobalt and manganese, form gels in petroleum spirits. While these gels are objectionable even when homogeneous, they ordinarily break into two phases consisting of a lower layer of solid gel masses high in metallic soap, and an upper layer of thin liquid low in metal concentration. Such material is commercially unusable because of its heterogeneous nature and uncertain composition.

(e) Metallic soaps exhibit strong tendency to form large colloidal micelles in petroleum solvents. Concentrated liquid driers are consequently of high viscosity, are difficult to remove cleanly from drums, and do not blend readily with less viscous oils or thinners, particularly at slightly reduced temperatures such as are commonly encountered in fall and winter seasons. The oil solubility of such viscous solutions is usually limited.

(f) Certain metal soaps, notably those of iron and copper, exhibit a tendency to hydrolyze and partially decompose during precipitation and subsequent dehydration. Sludging may continue during the storage life of the drier solution which is continuously depleted and reduced in metal content through precipitation of metal sludge.

A principal object of the present invention is to produce metallic soaps which are free or largely free of the objectionable characteristics or properties referred to hereinabove and which are therefore of enhanced utility as driers in the various industrial applications wherein metallic soap driers are commonly used. This objective is achieved, in accordance with the principles of the invention, by bringing about formation of the desired metallic soap in the presence of a water soluble, inorganic, unsubstituted phosphate, this term as herein employed including phosphoric acid, with the result that, in the modified metallic soap product, the drier metal appears to be chemically combined not only with the soap-forming organic acid employed but also with a lesser proportion of an unsubstituted inorganic phosphoric acid. The modified metallic soaps thus produced, which are believed to be of a wholly novel type, possess all the desirable characteristics of metal salt driers heretofore known, while also having certain new and highly valuable characteristics. For example, they are much easier to dehydrate, being in general of lower fusing point than respectively corresponding metal soaps lacking the phosphate component. Therefore they exhibit far less tendency to decompose and char during dehydration. In liquid form (i. e. dissolved in a solvent), the new driers are characterized by substantially lower viscosity for a given concentration than are the corresponding metal soaps previously known, are relatively easy to remove cleanly from drums or other containers and blend readily with oil or thinner vehicles even at relatively low seasonal temperatures. Solutions of the new metal soaps in petroleum spirits or other solvents commonly employed in the manufacture and use of liquid drier preparations are characterized by marked stability and practical freedom from gelation and sedimentation.

Briefly described, the production of soaps of drier metals in accordance with the principles of the invention, employing the precipitation procedure, may be carried out in practice in the following manner. A suitable quantity of an organic acid of known acid number is neutralized or saponified with a suitable proportion of an admixed alkali in water solution, the saponification being effected with the aid of heat where this is deemed desirable in order to expedite the saponifying reaction or to ensure carrying it to completion. Either before the saponifying step, or afterward, but in any event prior to precipitating the desired heavy metal soap from the resultant alkali metal soap solution, a comparatively small proportion of a water soluble compound comprising the unsubstituted phosphoric acid radical, that is, a suitable water soluble, inorganic, unsubstituted phosphate, is incorporated with the mix. The desired modified (phosphatized) heavy metal salt is precipitated from the alkali soap solution containing the phosphatic modifier and stabilizer by mixing therewith a water solution of the proper amount of a salt of the drier metal whose soap is to be prepared. The resultant amorphous precipitate, probably consisting largely of a complex salt of the drier metal with the organic acid and with the unsubstituted phosphoric acid, after being washed substantially free of soluble matter, is then dehydrated by melting and holding in molten condition, at a moderately elevated temperature in excess of 212° F. and somewhat above its melting point, typically in the general vicinity of 300° F., until dehydration is substantially complete. Subsequent treatment of the dehydrated product thus obtained, in readying it for commercial distribution and use, may be in accordance with the practice usual in the manufacture of driers.

Alkaline earth soaps as heretofore prepared are normally relatively infusible; but when prepared in accordance with the present invention they liquefy and dehydrate readily upon being heated to temperatures above 212° F. By means of the invention, vegetable acid heavy metal soaps can be produced with melting points so reduced that dehydration can now be accomplished more rapidly than before, yet with no impairment of color or solubility. Another important advantage realizable by the invention is that heavy metal soaps of tall oil and naphthenic acids may now, if desired, be prepared as readily handled liquids without diluting them with oils, thinners, organic acids, alcohols or amines; whereas these soaps as heretofore produced were sticky, amorphous masses in the undiluted state. Again, liquid driers prepared in accordance with the invention are in general thin liquids of unusual stability against gelation, sludging, darkening or skinning during storage. Manganous driers are straw colored in contrast to the red or dark brown manganous driers of the prior art; and even iron and copper driers are stable throughout storage life. Also, the oil solubility of driers produced in accordance with the invention is excellent.

In order to make further clear the underlying principles of the invention, a number of specific examples illustrating how it may advantageously be carried out in practice will now be given. It will of course be understood that these examples are in no sense restrictive with respect to precise operating details, but are intended only as explanatory and as providing general guidance for successful practice of the invention. In these examples, proportions of ingredients are to be understood as expressed in parts by weight unless otherwise indicated.

USE OF WATER-SOLUBLE TRIPOLYPHOSPHATE STABILIZERS

Employment of this type of phosphate stabilizer has been found effective and convenient.

*Example 1*

To 1250 parts of distilled naphthenic acid having an acid number of approximately 230 are added 205 parts of sodium hydroxide dissolved in 1400 parts of water; also 72 parts of sodium tripolyphosphate which may have been incorporated in the caustic soda solution or separately dissolved in 20 parts of water before being added. The mixture is thoroughly agitated and heated to boiling, the boiling being continued until saponification is complete. To the hot soapy reaction mixture is then slowly added, with agitation, a quantity of a water solution of calcium chloride containing 129 parts of calcium. While the concentration of the calcium chloride solution thus added is not critical, a concentration approximating 385 grams $CaCl_2$ (139 grams Ca) per liter is convenient and typically suitable to employ. Such a concentration is obtained by making up a solution containing 500 grams of commercial calcium chloride (77% $CaCl_2$) per liter.

The resulting amorphous precipitate of phosphatized calcium naphthenate, after being washed free of soluble salts by appropriate treatment with hot water, is then dried by carefully fusing it and maintaining it at approximately 300° F. until it is substantially free of all traces of moisture. At the stated temperature, the fused metal soap has the consistency of a thin oil and is amber in color; the elimination of water therefrom takes place rapidly and is effected without any evidence of decomposition or darkening in color. Dissolving the dehydrated product in mineral spirits and filtering the solution gives a liquid drier of brilliant clarity containing substantially 5% calcium and having a viscosity of $A_2$ Gardner at 25° C., not substantially greater than the viscosity of the mineral spirits component. This liquid drier maintains its stability and mobility even at very low seasonal temperatures and exhibits complete compatibility with linseed oil. In contrast to the new product, the conventional calcium naphthenate soap previously known but not subjected to the herein described phosphate stabilization solidifies, chars and decomposes when heated to about 212° F.; and while methods of somewhat alleviating that difficulty have been proposed, the oil compatibility of calcium naphthenate driers produced by such methods is highly unsatisfactory.

Example 2

The procedure in this instance is substantially the same as in Example 1, except thta 50 parts of sodium tripolyphosphate, instead of 72 parts, are employed as the stabilizer addition. The product obtained is similar in its general characteristics to that obtained in Example 1, but solutions thereof in drier solvents are of substantially higher viscosity for a given concentration. Thus, the viscosity of a mineral spirits solution containing 5% calcium is about Z Gardner at 25° C. It is evident that viscosity of the phosphatized calcium naphthenate increases with decrease in its phosphate radical content.

Example 3

Proceeding as described in Example 1, but employing 92 parts of potassium tripolyphosphate, instead of the equivalent 72 parts of sodium tripolyphosphate, results in a calcium naphthenate product substantially identical with the product obtained as described in Example 1.

Example 4

To 1080 parts of naphthenic acid having an acid number of approximately 225, is added 45 parts of sodium tripolyphosphate dissolved in 3000 parts of water. A quantity of 40° Bé. sodium hydroxide solution containing 174 parts of sodium hydroxide is then added under agitation and the resultant solution is heated to boiling. After saponificaiton is complete, a quantity of a water solution of manganese sulphate solution containing 132 parts of manganese, at a concentration (e. g.) of 80 grams manganese per liter, is then added and stirred into the soap, resulting in an amorphous precipitate of manganese naphthenate-phosphate soap which is separated from the aqueous salt solution and, after being thoroughly washed, is then dried by heating it to around 300° F. At this temperature the fused soap has the appearance of a fluid, straw-colored oil from which entrapped water is easily boiled out in a relatively short time. The resultant anhydrous product, dissolved in mineral spirits to a concentration of about 6% manganese and filtered, produces a pale sparkling liquid having a viscosity of about $A_5$ Gardner at 25° C., completely stable and mobile even at temperatures as low as 25° F. This drier solution is readily miscible with both raw and refined linseed oils, whereas previously known manganese naphthenate drier solutions, lacking the phosphate stabilizer modification but otherwise comparable, are dark brown liquids which rapidly lose their homogeneity during storage and are only incompletely soluble in linseed oils.

Example 5

To 2460 parts of water are added 185 parts of sodium tripolyphosphate, and to the resultant aqueous phosphate solution are added 1230 parts of naphthenic acid having an acid number of approximately 225 and thoroughly mixed therewith. The naphthenic acid is then saponified by treatment with 204 parts of sodium hydroxide in water solution, and the resulting soap may desirably be boiled for one-half hour, although this is not essential. To the sodium soap solution is then added a quantity of a water solution of cobalt sulphate containing 143 parts of cobalt. The resultant amorphous precipitate of cobalt naphthenate, with its phosphate component, is then heated to around 300° F., at which temperature it is highly fluid and is rapidly dehydrated to a purple oil. This anhydrous soap product, dissolved in mineral spirits to a cobalt concentration of 6%, and filtered, gives a clear deep purple solution having a viscosity of $A_1$ Gardner at 25° C. The stability and oil solubility of the drier are outstandingly good, whereas comparable cobalt soap driers of the prior art characteristically show considerable sludging and instability during storage.

Example 6

To 4000 parts of an aqueous solution containing 75 parts of sodium tripolyphosphate is added 2000 parts of commercial naphthenic acid of approximately 200 acid number. The mixture is warmed to 150° F. and mixer with a concentrated aqueous solution containing 330 parts of caustic soda. Saponification is completed by heating to boiling, and an aqueous solution containing 980 parts of copper sulphate is then added, with thorough mixing, to precipitate the copper naphthenate with its content of phosphatic stabilizer. Separation of the resultant reaction product, washing thereof and dehydration at about 300° F., are then effected as described in preceding examples. At the dehydration temperature, the phosphate stabilized copper naphthenate becomes an anhydrous green oil. Dissolving this dehydrate product in mineral spirits to give 6% copper concentration, and filtering, results in a fluid green product of unusual clarity, excellent stability and freedom from tendency to sedimentation and gel formation.

When it is attempted, in accordance with prior art practice, to produce unmodified copper naphthenate by metathesis, the decomposition which occurs during precipitation and thermal dehydration is excessive, resulting in low product yields. Furthermore, because of the quantity and nature of the inevitably accompanying insoluble reaction products, filtration of solutions of the unmodified copper soap product in mineral spirits (e. g.) is extremely difficult. As contrasted with such prior art products, phosphatized copper naphthenates produced in accordance with the present invention as herein described are not subject to decomposition, but melt easily at elevated temperatures of the order indicated without loss of copper or production of sludges which impede infiltration.

USE OF PRIMARY AND SECONDARY SODIUM AND AMMONIUM ORTHOPHOSPHATES AS STABILIZERS

The following examples illustrate how driers embodying the principles of the invention may be produced when employing this type of phosphate stabilizer.

Example 7

(a) To 1130 parts of naphthenic acid of approximately 225 acid number are added 183 parts of sodium hydroxide dissolved in 3000 parts of water, together with 30 parts of primary ammonium phosphate. The mixture is agitated and, most desirably, heated to boiling to effect substantially complete saponification. To the alkali soap mixture is then added a quantity of manganese sulphate solution, at a concentration of 80 grams manganese per liter, equivalent to 138 parts of manganese. The resultant amorphous precipitate of the manganese soap complex, after being separated from the accompanying aqueous liquor and thoroughly washed, is dried by heating it to approximately 300° F., at which temperature it has the appearance of a light brown oil from which entrapped water is readily boiled out without any apparent tendency toward decomposition or discoloration of the fused metal soap. Dissolving the resultant anhydrous product in mineral spirits to a concentration of 6% manganese, and filtering, yields a sparkling liquid having a viscosity of B Gardner at 25° C., which is completely stable, also mobile even at temperatures as low as 25° F. It is readily miscible with both raw and refined linseed oils. The most nearly comparable manganese naphthenate drier solution of the prior art is a dark brown viscous liquid which rapidly loses its homogeneity and is only incompletely soluble in linseed oils.

(b) If, with all other conditions remaining the same as in this Example 7 set forth, the stabilizer used is 50 parts of primary sodium phosphate instead of the 30 parts of primary ammonium phosphate specified, the described liquid drier containing 6% manganese has a viscosity of only A Gardner at 25° C., is permanently stable and remains mobile even at relatively low seasonal temperatures.

*Example 8*

The procedure in this instance is the same as in Example 7 except that the stated amount of primary ammonium phosphate addition is produced in situ by adding orthophosphoric acid (85%) and concentrated ammonium hydroxide in proper reacting proportions to the initial saponification mix.

*Example 9*

To 2500 parts of distilled tall oil of approximately 170 acid number are added 303 parts of sodium hydroxide dissolved in 7250 parts of water, together with 75 parts of primary ammonium phosphate. The mixture is boiled one-half hour to complete saponification, and an aqueous manganese sulphate solution is then mixed into the soap in sufficient quantity to provide 229 parts of manganese for precipitation of phosphatized manganese tallate. After separation of the light amber amorphous precipitate from the reaction liquor, it is washed by boiling four times with hot water and is then dehydrated by fusion at approximately 300° F. Upon dissolving the anhydrous product in ink oil to a concentration of 4% manganese, there results an ink drier having a Gardner viscosity of S at 25° C., characterized by excellent stability and oil miscibility, notably superior in these respects to comparable manganese tallate drier solutions heretofore known.

*Example 10*

To 1200 parts of distilled naphthenic acid having an acid number approximating 230 are added 1100 parts of water and substantially just sufficient 3.6 N sodium hydroxide to completely neutralize or saponify the naphthenic acid. There is added 48 parts of primary ammonium phosphate and the batch is mixed, heated to the boiling point to effect the desired saponification. To the soapy solution is then added a sufficient quantity of calcium chloride solution (139 grams calcium per liter) to precipitate all the naphthenic acid as the mixed naphthenate phosphate soap of calcium. The resultant precipitate of the calcium soap, after separation from the reaction liquor and thorough washing with hot water, is dried by fusion at about 300° F., at which temperature it has the appearance of a thin amber oil from which water is rapidly eliminated. The dehydrated product, dissolved in mineral spirits to a concentration of 5% calcium, and filtered, yields a solution of brilliant clarity having a viscosity of B Gardner at 25° C., permanently stable and miscible with linseed oil. Calcium naphthenate soaps precipitated in accordance with prior practice decompose and char when it is attempted to thermally dehydrate them.

*Example 11*

The same procedure is followed as in Example 10 except that the amount of primary ammonium phosphate stabilizer added is only 34 parts instead of 48 parts. A 5% mineral spirits solution of the dehydrated soap product precipitated under these conditions is heavier bodied, having a viscosity of G Gardner at 25° C.

*Example 12*

The viscosity of the calcium naphthenate solution constituting the final product of Example 10 may also be raised by substituting secondary ammonium phosphate for the primary ammonium phosphate used in that example. Thus, when 48 parts of primary ammonium phosphate used in Example 10 are replaced by 78 parts of secondary ammonium phosphate, the viscosity of the calcium naphthenate solution (5% calcium) finally produced is increased to $Z_4$ Gardner at 25° C. Both this solution, as well as the solution produced in accordance with Example 11, are characterized by good stability and oil miscibility. However, their viscosity is rather greater than is ordinarily desirable for some purposes.

*Example 13*

Primary and secondary sodium orthophosphates are also useful in preparing, in accordance with the invention, calcium soaps that are fusible and can be dehydrated at temperatures on the order of 300° F. without charring. Best results are obtained when approximately 70 parts of orthophosphate are used for each 1000 parts of the organic acid employed. The primary phosphate is more effective than the secondary phosphate in reducing the viscosity of solutions of the metal soaps.

*Example 14*

A phosphate-stabilized concentrated cobalt tallate drier suitable for printing inks may be prepared in the following manner. To 2100 parts of refined tall oil of approximately 185 acidity is added 6000 parts of water and sufficient 3.5 N sodium hydroxide solution to effect saponification under the usual conditions. Included in the saponification mix are 50 parts of primary ammonium phosphate, and the mix is boiled about one hour to complete the saponifying reaction. The desired complex cobalt tallate-phosphate soap is then precipitated by mixing into the alkali soap mass a sufficient volume of cobalt sulphate solution (85 grams cobalt per liter) to supply the required amount of cobalt for combination with the organic acid and phosphoric acid radicals. The resultant purple precipitate, after being separated from the saponification liquor and thoroughly washed, is thermally dehydrated by heating in the fused state at about 300° F. until evolution of moisture has ceased. The resultant anhydrous cobalt soap is a viscous purple fluid which, when dissolved in ink oil to produce a drier carrying 8% cobalt, has a viscosity of $Z_5$ Gardner and is characterized by excellent stability.

*Example 15*

A liquid cobalt naphthenate, phosphate-stabilized in accordance with the invention, may be prepared by dissolving 37 parts of primary ammonium phosphate in 2460 parts of water, mixing with this solution 1230 parts of naphthenic acid having an acid number of approximately 230, and a volume of 3.4 N caustic soda sufficient to effect saponification; then precipitating the desired complex cobalt naphthenate-phosphate soap by adding to the aqueous alkali soap mixture a volume of cobalt sulphate solution (85 grams cobalt per liter) sufficient for this purpose. The salt liquor is drained from the amorphous purple soap which, without washing, is dehydrated at 300° F. When the dehydrated metal soap is dissolved in mineral spirits to a concentration of 6% cobalt, and the solution is filtered free of inorganic sulphates, the resultant drier solution is a clear purple liquid having a viscosity of $A_2$ Gardner at 25° C., and has excellent stability and is completely miscible with commercial linseed oils.

By proceeding in accordance with the principles made clear in the foregoing specific examples, a very large variety of other phosphate-stabilized drier metal soaps, as well as stabilized drier solutions containing the same, may be prepared in accordance with the invention. A considerable number of these are set forth in the subjoined table wherein are designated (1) the particular drier metal organic acid salt or soap which, modified by phosphatization, constitutes the principal or primary component of the novel drier product; (2) the particular phosphate found typically useful in practice in preparing said product; and (3) a typical percentage of such phosphate found to give good results, figured on the weight of the particular organic acid with which the drier metal is combined in the soap product, such percentage being illustrative only, however, and capable of considerable variation within the scope of the invention.

| Phosphate-Stabilized Product | Phosphate Stabilizer Used | Percent of Stabilizer Used (based on wt. of organic acid) |
|---|---|---|
| Barium naphthenate | Sodium hexametaphosphate | 5 |
| Calcium naphthenate | do | 5 |
| Do | Tetrasodium pyrophosphate | 5 |
| Do | Disodium phosphate | 7 |
| Do | Dibasic ammonium phosphate | 6.5 |
| Do | Sodium tripolyphosphate | 6 |
| Do | Sodium polyphos | 5 |
| Do | Potassium tripolyphosphate | 7.4 |
| Calcium octoate | Primary ammonium phosphate | 7 |
| Do | Phosphoric acid (85%) | 14.5 |
| Calcium tallate | Sodium hexametaphosphate | 4 |
| Do | Sodium tripolyphosphate | 5 |
| Cobalt cornate | Sodium hexametaphosphate | 5 |
| Cobalt naphthenate | do | 5 |
| Do | Primary ammonium phosphate | 5 |
| Do | Sodium polyphos | 5 |
| Do | Sodium tripolyphosphate | 5 |
| Cobalt oleate | Sodium hexametaphosphate | 5 |
| Cobalt tallate (high resin) | do | 5 |
| Cobalt tallate | Primary ammonium phosphate | 3 |
| Do | Sodium polyphos | 4.5 |
| Cobalt tallate (low resin) | Sodium hexametaphosphate | 4.1 |
| Cobalt tallate | Sodium tripolyphosphate | 3.0 |
| Copper naphthenate | Sodium tripolyphosphate | 5 |
| Copper octoate | do | 10.4 |
| Iron linoleate | do | 2.6 |
| Iron naphthenate | Potassium tripolyphosphate | 4.3 |
| Do | Sodium hexametaphosphate | 5 |
| Do | Sodium tripolyphosphate | 3.6 |
| Iron octoate | Sodium hexametaphosphate | 5 |
| Do | Sodium tripolyphosphate | 3 |
| Iron tallate | do | 4.1 |
| Magnesium naphthenate | do | 6 |
| Do | Tetra sodium pyrophosphate | 6.5 |
| Manganese linoleate | Sodium tripolyphosphate | 1 |
| Manganese naphthenate | Sodium hexametaphosphate | 5 |
| Do | Primary ammonium phosphate | 5.6 |
| Do | Sodium tripolyphosphate | 4.2 |
| Do | Sodium polyphos | 3.8 |
| Do | Monosodium phosphate | 4.7 |
| Manganese octoate | Sodium hexametaphosphate | 8.3 |
| Do | Sodium tripolyphosphate | 6.9 |
| Manganese resinate | do | 5 |
| Manganese tallate | Sodium hexametaphosphate | 5 |
| Do | Primary ammonium phosphate | 3 |
| Do | Sodium tripolyphosphate | 4.8 |
| Zinc tallate | do | 5 |

"Sodium Polyphos," one of the phosphate stabilizers mentioned in the above table, is a proprietary hexametaphosphate-tetraphosphate composition.

Although the phosphate stabilizers employed in the examples hereinabove given are for the most part designated as the sodium salts, it is to be understood that, in general, any water-soluble unsubstituted phosphate, more especially any water-soluble alkali-metal or ammonium salt of the various forms of phosphoric acid, is useful in practicing the invention; but that the sodium salts are ordinarily quite as satisfactory as the others and are more economical to use. However, since it is important that the aqueous mixture from which the phosphatized metallic soap is to be precipitated shall not be unduly alkaline, employment of a normal orthophosphate (e. g. trisodium phosphate) as the stabilizer is not feasible because of its high pH, unless care be taken, by suitable addition of acid, first to bring the pH of the soluble soap and phosphate mixture down to about 8.0 or below prior to the precipitation step. It is accordingly better practice to use the primary or secondary, rather than the normal, orthophosphates as stabilizers, thereby ensuring that the pH of the precipitation mix will be suitable without special adjustment. In general, use of those phosphates having the lowest pH and the highest phosphoric anhydride ($P_2O_5$) content is found most advantageous.

The invention comprehends production of phosphatized metallic soaps of many other relatively high molecular organic acids in addition to those whose soaps are specifically mentioned hereinabove, including fatty acids generally, both saturated and unsaturated, such as stearic, palmitic, lauric, 2-ethyl hexoic, and linolenic; as well as complex acids such as those of rosin oil, and of natural and polymerized rosin. Also, production of phosphatized soaps of metals other than those expressly mentioned, such as lead, chromium, nickel, mercury, cadmium and strontium, for example, is to be understood as within the invention. Indeed, any of the products known to the industry as metallic soaps may be produced, generally with substantial advantage, in modified form in the manner herein disclosed; and such modified (phosphatized) products are as a rule characterized by markedly improved properties as regards both the resultant metallic soaps per se and solutions thereof ("liquid driers").

The proportion of the stabilizing phosphate addition to be used in practicing the invention may vary within relatively wide limits while still realizing the benefits of the invention to a substantial although not necessarily the optimum degree or extent. In any given instance, the proportion of the stabilizer addition to be employed for optimum results will depend upon various factors such, for example, as the particular drier metal soap that is to constitute the primary or base component of the desired stabilized drier product, the desired viscosity of such product, and so on. For a large number of the more widely employed drier metal soaps, a typical proportioning of the phosphate stabilizer to be chemically combined with that primary metal soap component, operative to produce commercially acceptable stabilized drier products in accordance with the invention, is set forth in the detailed specific examples hereinabove given and in the table of further informational data following those examples. However, it should not be inferred that the percentages indicated are necessarily optimum in all cases or that they all produce the same degree of stabilization. As a general rule to which there are occasional exceptions, it may be stated that employment of the phosphate stabilizer in proportion lower than on the order of 2 or 3 percent of the weight of organic acid used seldom results in sufficient improvement over the corresponding conventional or previously known unstabilized drier product to be commercial worth while. Employing the phosphate stabilizer in proportion higher than around 20 to 25 percent of the weight of the organic acid is seldom advisable, and may even have objectionable effects as will presently appear. In the great majority of cases, using in the neighborhood of 4 to 8 percent is found to result in a satisfactory product that is notably superior in its properties to the corresponding unphosphatized metallic soap of the prior art. Despite its admittedly somewhat empirical character, this has been found a generally useful working rule.

In most instances it is sound practical procedure to use, in the precipitating step, a quantity of precipitant (drier metal salt) substantially equivalent to the total acidic groups, both organic and phosphate, present in the phosphate-containing alkali soap solution with which the precipitant is mixed. The above-indicated percentages and percentage ranges for the phosphate stabilizer addition apply when such precipitating procedure is followed. However, strict adherence to this procedure is not essential to successful practice of the new process, considerable latitude in proportioning of the drier metal precipitant with reference to the acidic groups being permissible due apparently to the highly complex chemical character of the resultant phosphatized metal soap precipitate, and the wide variability thereof, while still realizing the benefits of the invention in substantial degree. In general, at least enough drier metal salt should be added to eliminate the soapiness of the batch; this resulting in a phosphatized metal soap of notably improved properties. Further additions produce, within limits, lower viscosity stabilized driers and higher yields, a phenomenon not entirely due to added pickup of stabilizer, but evidently due in part to other considerations such as reaction equilibria and the virtually infinite variety of combinations or associations of the reactants as components of the soap complex precipitated. While it cannot at present be stated with certainty whether the stabilized (phosphatized) composition produced is a metal complex in the strict sense of the term, or is more in the nature of an intimate association of metal soap and metal complex, the probability that it is the latter is perhaps indicated by the fact that, in addition to considerable permissible variation in the proportioning of the organic or "fatty acid" and phosphate radicals in the precipitating reaction mix in producing a phosphatized soap of a given drier metal, the proportion of drier metal salt employed, with respect to any given proportioning of those other reactants, may also be varied considerably while still obtaining commercially desirable stabilized drier products within the invention. Ordinarily, where the proportion of the phosphate addition is not excessive, the practical upper limit for the proportion of drier metal salt used is determined by the concentration of that salt remaining dissolved in the aqueous mother liquor following the precipitation. This concentration should ordinarily not represent an excess of precipitant greater than is needed to ensure complete precipitation of the organic and phosphate radicals. Especially in the case of a relatively costly precipitating salt, such as a cobalt salt, it is obviously uneconomical to use any unnecessary excess.

By varying the proportions of stabilizer and organic acid relative to each other and to the metal salt precipitant, it is possible to vary considerably the viscosity of liquid driers prepared from the resultant phosphatized metal soap precipitated, but in any event such viscosity is lower than that of the comparable unphosphatized liquid drier product of the prior art. In general, such lowering or reduction in viscosity becomes greater as the proportion of phosphate stabilizer employed in manufacturing the new metallic soaps increases; while decreasing the proportion of stabilizer results in smaller viscosity reduction. A rather wide range in the magnitude of such reductions in viscosity is therefore possible, rendering it feasible, where desirable, to achieve any desired viscosity for the novel stabilized drier within a corresponding range.

One phosphate stabilizer may ordinarily be substituted for another in proportion, roughly to its $P_2O_5$ content, provided the two do not differ widely in pH. Since higher pH is usually associated with lower $P_2O_5$ content, allowance must be made for the lower activity of the less acid phosphates, in addition to requirements estimated from the $P_2O_5$ content. Where there is little difference between the pH of two water soluble phosphates, there appears to be ordinarily little difference in the properties of the respective drier metal soap complexes resulting from use thereof.

The use of an unnecessarily large excess of phosphate stabilizer in practicing the invention results in operating difficulties but does not, as a rule, materially affect the quality of the drier produced. Among these operating difficulties are (a) High metal losses. The conversion of metal to metal phosphate not chemically bound to the phosphatized metal soap precipitated, and insoluble in the usual drier solvents and oil vehicles, appears to be favored.

(b) Tedious filtration of insoluble metal phosphates from the precipitated metal soap complex.

(c) Emulsification of the precipitated soap complex with the aqueous mother liquor and with wash water. This is particularly bad when the polyphosphates are used in large excess.

Instead of employing the aforesaid alkali metal and ammonium phosphate stabilizers as such (i. e. pre-formed), it is of course feasible to form them in situ by reaction between phosphoric acid with the respective base components in proper proportions to give a phosphate having a suitable pH. This way of proceeding is ordinarily less convenient, however, than to use the pre-formed phosphates.

It is also to be understood that two or more water soluble stabilizer phosphates may be simultaneously employed in the reaction mix, so proportioned relative to each other as to give the reaction mix any desired pH within a range appropriate for effecting precipitation of the metal soap complex.

The magnitude of the $P_2O_5$ component of the phosphatized drier metal soap complex produced in accordance with the invention, relative to the metal and organic acid components thereof, may vary widely in conformity with the herein disclosed permissible wide variability of the manufacturing process as regards operational details. Among such details may be mentioned the particular type of unsubstituted inorganic soluble phosphate employed, and its proportioning with respect to the other components of the reaction mix wherein occurs the interaction resulting in formation of the phosphatized metal soap complex. Thus, in the case of such a complex produced by precipitation, assuming the proportioning of the components of the mix at the time of precipitation to fairly well approximate stoichiometric proportioning, the major part (commonly well over 60 percent) of the $P_2O_5$ content of the precipitating mix will ordinarily be present (although not actually as $P_2O_5$, of course) in the precipitated soap complex. In said complex, as has been already stated hereinabove, the phosphate or $P_2O_5$ component is so bound to or interunited with the metal and organic acid components, apparently chemically, as to be an integral part of said complex. Evidence of this is afforded by the ready solubility of the complex in drier solvents, in contrast to the insolubility of straight metal phosphates therein. This intimate union of the components of the complex persists, seemingly unaltered, throughout the subsequent manufacturing operations of dehydration by fusion, solvation of the anhydrous soap complex in solvents, etc., in preparing for commercial distribution the drier products containing it. Where the phosphatizing agent present in the precipitating mix is monosodium (or potassium) phosphate, sodium (or potassium) tripolyphosphate, or primary ammonium phosphate, for example, a maximum of practically all (98 percent or more) of the $P_2O_5$ content may, under the conditions just assumed, be present in the phosphatized drier metal soap complex precipitated, in the indicated close union with the other components thereof.

From the foregoing, it will therefore be readily apparent that, depending upon the particular operating conditions attending production of the herein disclosed phosphatized metal soap compositions, the phosphate content thereof (calculated as $P_2O_5$) may vary from a minimum of as little as a fraction of one percent where the amount of phosphate stabilizer employed in the manufacturing process is only 2 or 3 percent of the weight of the organic acid used, to a maximum determined and limited by the condition that said amount of phosphate stabilizer is always less by weight than the amount of organic acid and hence always in minor proportion relative to the drier metal and organic acid radicals taken together, and by the further condition that it is impractical, for reasons pointed out hereinabove, to employ a large excess of phosphate stabilizer in producing the new soap compositions.

The actual phosphate content (figured as $P_2O_5$) of several stabilized metallic soaps and solutions thereof ("liquid driers") which are typical of desirable commercial drier products that may be manufactured in accordance with the process of the invention, is shown in the following table. These typical products are obtainable by following the procedures described in certain of the specific illustrative examples hereinabove given, which examples are referred to in the first column of the table.

| Reference Example No. | Stabilized Metal Soap | Percent $P_2O_5$ in Anhydrous Metal Soap | Solution of Metal Soap ("Liquid Drier") | |
|---|---|---|---|---|
| | | | Percent Metal in Solution | Percent $P_2O_5$ in Solution |
| 1 | Calcium Napthenate | 2.9 | 5 | 1.6 |
| 4 | Manganese Naphthenate | 2.2 | 6 | 1.3 |
| 7(b) | do | 2.4 | 6 | 1.7 |
| 9 | Manganese Tallate | 2.9 | 4 | 1.4 |
| 10 | Calcium Naphthenate | 2.4 | 5 | 1.4 |
| 14 | Cobalt Tallate | 1.5 | 4 | 0.7 |
| 15 | Cobalt Naphthenate | 1.8 | 6 | 0.9 |

In some instances, where the desired metal soap is adequately fusible even as produced in the conventional manner of the prior art, so that the time required for dehydrating is not unreasonably long, the phosphate content of the corresponding modified metal soap produced in accordance with the present invention may be much lower than that of any included in the above table. But whereas the conventional soap undergoes discoloration and decomposition to at least a substantial extent during dehydration, due to its extreme sensitiveness to heat, the modified soap of the present invention does not discolor or decompose even though its phosphate content be much lower than any shown in the table (1% $P_2O_5$, say, for cobalt linoleate by way of example) and it be subjected to the same dehydrating temperature for the same length of time.

In the foregoing detailed description of the manufacture of various specific drier products in accordance with the new process, reference has been made to the fact that, in thermally dehydrating the washed soap complex precipitate in fused condition, the fused soap is maintained at a temperature in the neighborhood of 300° F. until moisture has been eliminated therefrom. This temperature has been customarily used in prior practice in dehydrating such heretofore known conventional metallic soaps as were fusible and sufficiently fluid at that temperature; but in most cases the fused soap of the conventional type commonly undergoes more or less decomposition, tends to solidify and, at best, darkens substantially in color. Nevertheless, where dehydration by fusion was at all applicable in prior practice, despite these disadvantages, employment of about 300° F. was necessary from a practical standpoint because, at lower temperatures, elimination of contained moisture was far from complete and proceeded far too slowly.

In carrying out the present invention, the substantially lower fusion points of the various phosphatized metal soap complexes produced, and their much greater resistance to thermal decomposition, permits them to be much more rapidly dehydrated at the conventional dehydrating temperature of 300° F. than is possible with the conventional soaps, yet without decomposition or darkening in color. Many of the new phosphate-stabilized soaps are sufficiently fluid at temperatures even as low as 230° F. to permit their being dehydrated at that temperature, but the operation would of course be more time consuming and, in view of their marked resistance to thermal decomposition even at the conventional dehydrating temperature of 300° F. there would be no advantage, and indeed some practical disadvantage, in using the lower dehydrating temperature indicated.

As further illustrating this point, it may be noted that conventional manganese naphthenate is a hard solid which is chopped into lumps and combined with additives to form a usable drier. The phosphate-stabilized "solid" (i. e. dehydrated) manganese naphthenate of the present invention is sufficiently fluid to be poured from a gently warmed drum into mineral spirits, in which it dissolves immediately, forming a drier solution immediately without the use of additives. So also, phosphate-stabilized "solid" tallate driers are sufficiently fluid to be used without dilution, whereas the metallic tallates known to the prior art are gummy resins. While metal soaps, whether or not phosphatized, are amorphous materials which soften gradually and do not melt sharply it is worthy of note that manganese linoleate as conventionally produced has, typically, a melting point of 380° F.; whereas phosphatized manganese linoleate prepared in accordance with the present invention has a melting point of only 245° F., when using as little as one percent sodium tripolyphosphate in the precipitating mix.

The actual time required to dehydrate the fused, phosphatized metallic soaps of this invention, under what may be called the usual or standard conditions described hereinabove, necessarily varies depending upon such factors as the particular soap and the size of the batch involved. In practice this time may range from a period on the order of 15 to 30 minutes in the case of small batches consisting of only a few pounds, to several hours for plant batches on the order of 1000 to 2000 pounds, for example. However, where it is possible to make comparisons with prior conventional practice, it may be stated generally that dehydration of the drier metal soaps of the present invention having a phosphate content of the order shown in the above table of typical stabilized metal driers ordinarily requires not more than one-quarter to one-half the time required to dehydrate the respectively corresponding conventional (unmodified) metal soaps heretofore produced.

As will be evident from the foregoing, one of the great advantages of the present invention is that use of the new process requires little or no change in the general operating technique heretofore commonly employed in the conventional process of producing the unstabilized metallic soaps to which the industry has so long been accustomed. Nor is it required to make use of specially prepared and costly reagents in order to achieve the desired stabilizing effect. On the contrary, the phosphate stabilizers employed in the present process are in abundant supply and relatively very cheap. Adaptability of the conventional operating technique for carrying out the new process is further illustrated by the fact that it is even feasible, for example, to carry out the new procedure by accomplishing the precipitation of the phosphatized metallic soap complex in the presence of mineral spirits or other suitable non-aqueous solvent admixed with the aqueous soapy precipitating batch. This modified procedure, within the scope of the invention, is analogous to an operating technique already well known in manufacture of conventional drier compositions. The phosphatized metal soap complex dissolves directly into the non-aqueous solvent phase of the precipitating mix, thus producing a substantially anhydrous liquid drier product without going through the thermal dehydration of the precipitated soap complex prior to dissolving it in a non-aqueous solvent as described in the specific examples given hereinabove.

What is claimed is:

1. The process of producing an improved drier metal soap which comprises saponifying a relatively high-molecular weight monobasic organic acid containing at least seven carbon atoms by heating in mixture with aqueous alkali and, in the presence of a water-soluble inorganic unsubstituted phosphate admixed in smaller quantity than such organic compound and, with the pH of the mix below that of normal alkali orthophosphate, adding a water-soluble salt of a drier metal whereby to precipitate a phosphate-containing drier metal soap of said organic acid.

2. The process as defined in claim 1, wherein said phosphate is admixed with the organic acid and aqueous alkali prior to effecting the saponification.

3. The process as defined in claim 1, which further includes separating the precipitated soap from the associated liquor, and dehydrating it by maintaining it in fused condition at above 212° F. until substantially all moisture has been eliminated therefrom.

4. The process as defined in claim 3, which further includes dissolving the dehydrated product in a suitable drier solvent to a predetermined concentration of the drier metal.

5. The process of producing an improved drier metal soap which comprises saponifying a relatively high-molecular weight monobasic organic acid containing at least seven carbon atoms in mixture with aqueous alkali and, in the presence of a water-soluble unsubstituted phosphate admixed in smaller quantity than such organic compound selected from the group consisting of phosphoric acid, water-soluble polyphosphates and pyrophosphates, and mono- and di-basic alkali and ammonium orthophosphates, adding a water-soluble salt of a drier metal whereby to precipitate a phosphate-containing drier metal soap of said organic acid, the pH of the precipitation mix being not substantially higher than 8.

6. The process as defined in claim 5 which further includes separating the precipitated soap from the associated liquor, washing it substantially free of soluble matter, and dehydrating it by maintaining it in fused condition at above 212° F. until substantially all moisture has been eliminated therefrom.

7. The process as defined in claim 6, which further includes dissolving the dehydrated product in a suitable drier solvent to a predetermined concentration of the drier metal.

8. The process as defined in claim 5, wherein the precipitation of the phosphate-containing drier metal soap occurs in the presence of a drier solvent admixed with the aqueous precipitating mix, whereby the phosphatized metal soap, as it forms, is dissolved by said solvent.

9. The process as defined in claim 1, wherein said organic acid is one of the group consisting of fatty, resin and naphthenic acids.

References Cited in the file of this patent
UNITED STATES PATENTS

| | | |
|---|---|---|
| Re. 23,119 | Fischer | May 31, 1949 |
| 2,113,496 | Roon et al. | Apr. 5, 1938 |
| 2,116,321 | Minnich | May 3, 1938 |
| 2,152,744 | Kalman | Apr. 4, 1939 |
| 2,345,061 | Miles | Mar. 28, 1944 |
| 2,386,250 | McNally et al. | Oct. 9, 1945 |
| 2,409,774 | Mack | Oct. 26, 1946 |
| 2,417,429 | McLennan | Mar. 18, 1947 |
| 2,513,680 | Schott | July 4, 1950 |
| 2,528,429 | Elliott | Oct. 31, 1950 |
| 2,541,977 | Earhart | Feb. 20, 1951 |
| 2,600,058 | Knowles | June 10, 1952 |

OTHER REFERENCES

"Paint and Varnish Technology," Von Fisher, pp. 270–271 (1948).

UNITED STATES PATENT OFFICE

CERTIFICATE OF CORRECTION

Patent No. 2,793,962                                       May 28, 1957

Albert V. Collins et al.

It is hereby certified that error appears in the printed specification of the above numbered patent requiring correction and that the said Letters Patent should read as corrected below.

Column 4, line 43, for "20 parts" read --200 parts--; column 5, line 7, for "thta" read --that--; line 33, for "saponificaiton" read --saponification--; line 34, strike out "solution", second occurrence; column 6, line 8, for "mixer" read --mixed--; line 19, for "dehydrate" read --dehydrated--; line 38, for "infiltration" read --filtration--; column 8, line 58, for "at $A_2$" read --of $A_2$--; column 10, line 4, after "molecular" insert --weight--; line 48, for "commercial" read --commercially--; column 11, line 50, after "roughly" insert a comma.

Signed and sealed this 15th day of October 1957.

(SEAL)
Attest:

KARL H. AXLINE

Attesting Officer

ROBERT C. WATSON
Commissioner of Patents